(12) United States Patent
Huang et al.

(10) Patent No.: US 11,824,393 B2
(45) Date of Patent: Nov. 21, 2023

(54) POWER SUPPLYING DEVICE, METHOD AND SECURE SYSTEM

(71) Applicant: NUVOTON TECHNOLOGY CORPORATION, Hsinchu (TW)

(72) Inventors: Po-Hsuan Huang, Hsinchu (TW); Chung Ming Hsieh, Hsinchu (TW)

(73) Assignee: NUVOTON TECHNOLOGY CORPORATION, Hsinchu (TW)

(*) Notice: Subject to any disclaimer, the term of this patent is extended or adjusted under 35 U.S.C. 154(b) by 0 days.

(21) Appl. No.: 17/952,968

(22) Filed: Sep. 26, 2022

(65) Prior Publication Data

US 2023/0115035 A1 Apr. 13, 2023

Related U.S. Application Data

(60) Provisional application No. 63/248,664, filed on Sep. 27, 2021.

(30) Foreign Application Priority Data

Apr. 6, 2022 (TW) ................... 111113053

(51) Int. Cl.
*H02J 7/00* (2006.01)
*G06F 21/72* (2013.01)
*G06F 21/75* (2013.01)
*H02J 7/34* (2006.01)

(52) U.S. Cl.
CPC .......... *H02J 7/00712* (2020.01); *G06F 21/72* (2013.01); *G06F 21/755* (2017.08); *H02J 7/345* (2013.01); *H02J 2207/50* (2020.01)

(58) Field of Classification Search
CPC .... H02J 7/00712; H02J 2207/50; H02J 7/345; G06F 21/755; G06F 21/72
See application file for complete search history.

(56) References Cited

U.S. PATENT DOCUMENTS 9,430,678 B2 * 8/2016 Yannette ............. H03K 19/003

* cited by examiner

*Primary Examiner* — Carlos Amaya
(74) *Attorney, Agent, or Firm* — Muncy, Geissler, Olds & Lowe, P.C.

(57) ABSTRACT

A power supply device for providing a driving voltage of an encryption/decryption device. When the encryption/decryption device is in operation and its driving voltage falls within the voltage range formed by an upper limit voltage and a lower limit voltage, only a supply voltage provided by a secure power supply device is used as the driving voltage for the encryption/decryption device. When the encryption and decryption device is in operation and its driving voltage falls outside the voltage range formed by the upper limit voltage and the lower limit voltage, the supply voltage and a stable voltage provided by the stable voltage source are used as the driving voltage at the same time, the supply voltage is further adjusted until the driving voltage falls within the voltage range formed by the upper limit voltage and the lower limit voltage, and then continue to use only the supply voltage as the driving voltage.

15 Claims, 5 Drawing Sheets

POWER SUPPLYING DEVICE, METHOD AND SECURE SYSTEM

CROSS-REFERENCE TO RELATED APPLICATION

This application claims the priority benefit of U.S. application Ser. No. 63/248,664, filed on Sep. 27, 2021, and further claims the foreign priority benefit of TW application serial no. 111113053, filed on Apr. 6, 2022, the full disclosures of which are incorporated herein by reference.

BACKGROUND

Technical Field

The present disclosure relates to a power supplying device, a method and a secure system. More particularly, the present disclosure relates to a power supplying device, a method and a secure system, all of which are capable of preventing the hackers from maliciously obtaining security information by detecting a variation of a system voltage of a power and a corresponding current value variation.

Description of Related Art

In recent years, safety applications are implemented in many fields, including ID cards, credit cards, computer access control and mobile phones (e.g., SIM cards). These applications are usually dependent on encrypted computing of keys to realize the high security, wherein the encrypted computing of the keys is embedded in the storage device. However, hackers will try to access these keys to conduct unauthorized trades. For example, a side attack is a most common way to access messages from the card or the computing system during a period of a regular operation. It may execute the decryption to the keys based on a sequence signal, a power consumption and an electromagnetic field. Thus, when designing the secure system, it is necessary to consider how to remain the data security and to avoid the side attack.

The situation of the side attack on the power is described as follows. The hackers may detect the current change and the power characteristics generated by the current change (usually, the driving voltage applied to the encryption/decryption device is also changed with the current change) during switching of logic gates of the encryption/decryption device (realized by the logic gates), and the hackers can monitor these power characteristics through the power pins to recover the encrypted key. To prevent the hackers from reading the power and the ground signal from the logic gates, the power pin and the ground pin are usually isolated from the external pad.

Figure 1:
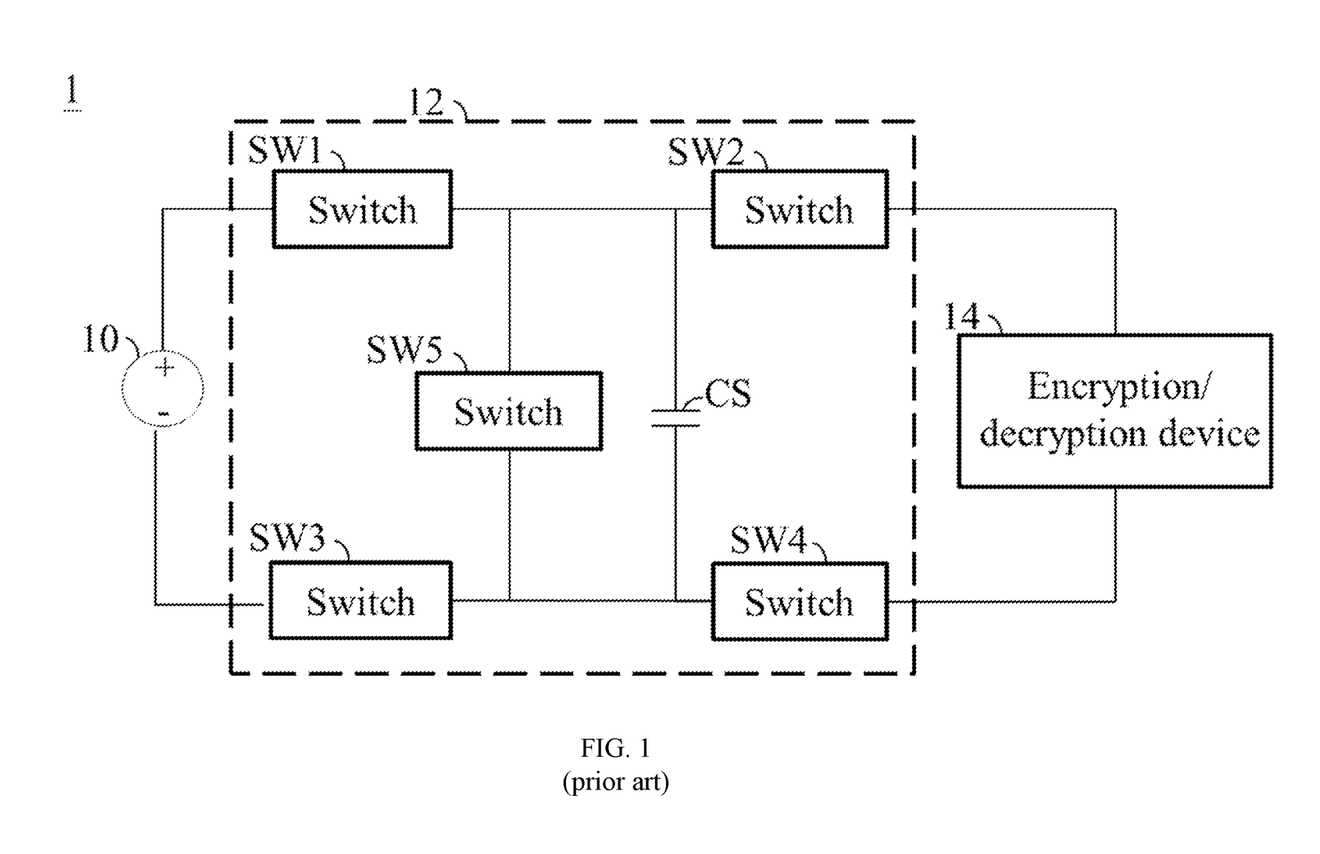
FIG. 1 is a circuit diagram of a secure system in the prior art.

Refer to FIG. 1, and FIG. 1 is a circuit diagram of a secure system in the prior art. The secure system 1 includes a power 10, a power supply device 12 and an encryption/decryption device 14, wherein the power supply device 12 is electrically connected to the power 10 and the encryption/decryption device 14, in order to avoid hackers to obtain a power characteristic associated with a security information by detecting a power pin and a ground pin of the power 10. The power supply device 12 includes a plurality of switches SW1~SW5 and a charge storage capacitor CS. One terminal of the switch SW1 is electrically connected to a system voltage of the power 10, and the other terminal of the switch SW1 is electrically connected to one terminal of the switch SW2, one terminal of the switch SW5 and one terminal of the charge storage capacitor CS. The other terminal of the switch SW2 is electrically connected to one terminal of the encryption/decryption device 14, so as to output a supply voltage to the encryption/decryption device 14 as a driving voltage of the encryption/decryption device 14. One terminal of the switch SW3 is electrically connected to a ground voltage of the power 10, and other terminal of the switch SW3 is electrically connected to one terminal of the switch SW4, the other terminal of the switch SW5, and the other terminal of the charge storage capacitor CS. The other terminal of the switch SW4 is electrically connected to the other terminal of the encryption/decryption device 14, so as to provide the ground voltage to the encryption/decryption device 14.

The process that the power supply device 12 provides the supply voltage is illustrated as follows. Firstly, at the first phase, only the switch SW5 is conductive, and other switches SW1~SW4 are opened, so as to discharge the charge storage capacitor CS to a specific voltage level, i.e., the switch SW5 is used as a reset switch. At the second phase, the switches SW1 and SW3 are conductive, and other switches SW2, SW4 and SW5 are opened, so that the charge storage capacitor CS is charged by the system voltage of the power 10, and the third phase is executed after the charge storage capacitor CS is charged to the voltage level of the system voltage. At the third phase, the switches SW2 and SW4 are conductive, other switches SW1, SW3 and SW5 are opened, and the charge storage capacitor CS provides the supply voltage to the encryption/decryption device 14 as the driving voltage. Then, at the fourth phase, the encryption/decryption device 14 is allowed to encrypt/decrypt. After finishing the fourth phase, turn back to the first phase.

Through the manner described above, it may avoid hackers to obtain the power characteristics associated with the security information by detecting the power pin and the ground pin of the power 10. However, the above manner must be designed to make ensure that the charge capacity stored in the charge storage capacitor CS is enough to provide a large amount of charge consumed by the encryption/decryption device 14 for encrypting and decrypting. Thus, the size of the charge storage capacitor CS has to be large enough. Furthermore, the manner is not a power saving solution because the manner has to discharge the charge storage capacitor CS to the specific voltage level at the first phase. Additionally, the larger size the charge storage capacitor CS is, the longer the charge/discharge time is, so it is time-consuming overall. Moreover, the manner needs four phases to ensure the encryption/decryption device 14 works as normal.

SUMMARY

An embodiment of the present disclosure provides a power supply device, configured to supply a power to an encryption/decryption device of a secure system, including a secure power supply device, a stable voltage source and a voltage selection device. The secure power supply device is configured to provide a supply voltage, wherein the supply voltage is dynamically adjusted based on an operation of the encryption/decryption device. The stable voltage source is configured to provide a stable voltage. The voltage selection device is electrically connected to the secure power supply device, the stable voltage source and the encryption/decryption device. When the encryption/decryption device is in operation, and a driving voltage of the encryption/decryption device is fallen within a voltage range between an upper limit voltage and a lower limit voltage, the voltage selection device selects only the supply voltage as the driving voltage for the encryption/decryption device. When the encryption/decryption device is in operation, and the driving voltage is fallen outside the voltage range, the voltage selection device selects both of the supply voltage and the stable voltage as the driving voltage for the encryption/decryption device, and the supply voltage is adjusted until the driving voltage falls within the voltage range.

An embodiment of the present disclosure further provides a secure system, including the power supply device and the encryption/decryption device.

An embodiment of the present disclosure further provides a power supplying method, configured to provide a power to an encryption/decryption device of a secure system, and includes the following steps. When the encryption/decryption device is in operation and a driving voltage is greater than an upper limit voltage, selecting both of a supply voltage provided by a secure power supply device and a stable voltage provided by a stable voltage source as a driving voltage, and decreasing the supply voltage until the driving voltage is less than the upper limit voltage. After the driving voltage is less than the upper limit voltage, selecting only the supply voltage as the driving voltage. When the encryption/decryption device is in operation, and the driving voltage is less than the lower limit voltage, selecting both of the supply voltage and the stable voltage as the driving voltage, and increasing the supply voltage until the driving voltage is greater than the lower limit voltage. After the driving voltage is greater than the lower limit voltage, selecting only the supply voltage as the driving voltage. When the encryption/decryption device is in operation, and the driving voltage is fallen within a voltage range between the upper limit voltage and the lower limit voltage, selecting only the supply voltage as the driving voltage.

An embodiment of the present disclosure further provides a power supply device, configured to provide a power to an encryption/decryption device of a secure system, and includes a secure power supply device, a stable voltage source and a voltage selection device. The secure power supply device is configured to provide a supply voltage based on a system voltage, wherein the supply voltage is dynamically adjusted based on an operation of the encryption/decryption device. The stable voltage source is configured to provide a stable voltage. The voltage selection device is electrically connected to the secure power supply device, the stable voltage source and the encryption/decryption device. When the encryption/decryption device is in operation, and a driving voltage of the encryption/decryption device is fallen within the voltage range between an upper limit voltage and a lower limit voltage, the voltage selection device selects only the supply voltage as the driving voltage for the encryption/decryption device. When the encryption/decryption device is in operation, and the driving voltage is fallen outside the voltage range, the voltage selection device selects only the stable voltage as the driving voltage for the encryption/decryption device, the supply voltage is adjusted until the driving voltage falls within the voltage range, and then only the supply voltage is selected as the driving voltage for the encryption/decryption device.

In summary, compared to the prior art, a plurality of power supply devices, methods and secure systems provided in the embodiments of the present disclosure may obtain one of the technical effects as follows. The demanded size of the charge storage capacitor is reduced, the operating time is reduced, and the current consumption and the circuit area are also reduced. The power supply device provided in the embodiment of the present disclosure can protect the secure system effectively, and avoid hackers to obtain the security information through the power characteristics detected via the power pin and the ground pin.

In order to further understand the technology, means, and effects of the present disclosure, reference may be made by the detailed description and drawing as follows. Accordingly, the purposes, features and concepts of the present disclosure can be thoroughly and concretely understood. However, the following detailed description and drawings are only used to reference and illustrate the implementation of the present disclosure, and they are not used to limit the present disclosure.

BRIEF DESCRIPTION OF THE DRAWINGS

The accompanying drawings are provided to enable person having ordinary skill in the art can further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DETAILED DESCRIPTION

Reference will now be made in detail to exemplary embodiments of the present disclosure, exemplary embodiments of which are illustrated in the accompanying drawings. Wherever possible, the same element number is used in the drawings and the description to refer to the same or the similar part. Furthermore, exemplary embodiments are only one of implemental ways in the concept of design of the present disclosure, none of exemplars described below is intended to limit the present disclosure.

In order to solve the issues in the prior art, a plurality of power supply devices, methods and secure systems provided in the embodiments of the present disclosure can avoid hackers to obtain the security information through the power characteristics detected via the power pin and the ground pin, and may also obtain one of the technical effects as follows. Under the condition that the safety protection effect is achieved, the demanded size of the charge storage capacitor is reduced, the operating time is reduced, the current consumption is reduced, and the circuit area is reduced.

In an embodiment of the present disclosure, a power supply device includes a secure power supply device, a stable voltage source and a voltage selection device, wherein the voltage selection device is electrically connected to the secure power supply device, the stable voltage source and the encryption/decryption device. When the encryption/decryption device executes the encryption/decryption (i.e., the encryption/decryption device is in operation), the driving voltage of the encryption/decryption device is monitored by the voltage selection device. When the driving voltage of the encryption/decryption device is fallen within a voltage range between an upper limit voltage and a lower limit voltage, the voltage selection device selects the supply voltage as the driving voltage for the encryption/decryption device; and, when the driving voltage is greater than the upper limit voltage or less than the lower limit voltage (i.e., the driving voltage is fallen outside the voltage range), the voltage selection device selects both the stable voltage provided by the stable voltage source and the supply voltage provided by the secure power supply device as the driving voltage for the encryption/decryption device.

Furthermore, when the driving voltage is greater than the upper limit voltage, the voltage selection device decreases the supply voltage provided by the secure power supply device until the driving voltage is less than the upper limit voltage. Moreover, when the driving voltage is less than the lower limit voltage, the voltage selection device increases the supply voltage provided by the secure power supply device until the driving voltage is greater than the lower limit voltage.

The voltage selection device further includes a mode switch controller and a switch. During a startup period, the voltage selection device controls the switch to be conductive through the mode switch controller, and only the stable voltage provided by the stable voltage source is used as the driving voltage. During the startup period, the driving voltage of the encryption/decryption device is gradually increased. When the driving voltage is increased to the target voltage (e.g., another system voltage less than the maximum system voltage) and is sustained for a period of time, the startup period is finished. After the startup period is finished, the mode switch controller controls the switch to be opened or conductive based on whether the encryption/decryption device executes the encryption/decryption, so as to determine whether the supply voltage provided by the secure power supply device is selected as the driving voltage for the encryption/decryption device or the stable voltage provided by the stable voltage is selected as the driving voltage for the encryption/decryption device.

This manner makes the stable voltage source maintain the driving voltage as the stable voltage when the encryption/decryption device does not execute the encryption/decryption after the startup period is finished. Only when the encryption/decryption device executes the encryption/decryption, and the driving voltage is fallen within a voltage range between an upper limit voltage and a lower limit voltage, only the supply voltage provided by the secure power supply device is selected as the driving voltage for the encryption/decryption device. When the driving voltage is fallen outside the voltage range, both of the supply voltage and the stable voltage are selected as the driving voltage, and the supply voltage is adjusted until the driving voltage falls within the voltage range. Accordingly, the power supply device provided in an embodiment of the present disclosure may solve the technical issue that the driving voltage is decreased suddenly since the encryption/decryption device needs huge current consumption when the encryption/decryption device executes the encryption/decryption. Compared to the prior art, the manner in the embodiment may reduce the demanded size of the charge storage capacitor, the operating time, the current consumption, and the circuit area.

Figure 2:
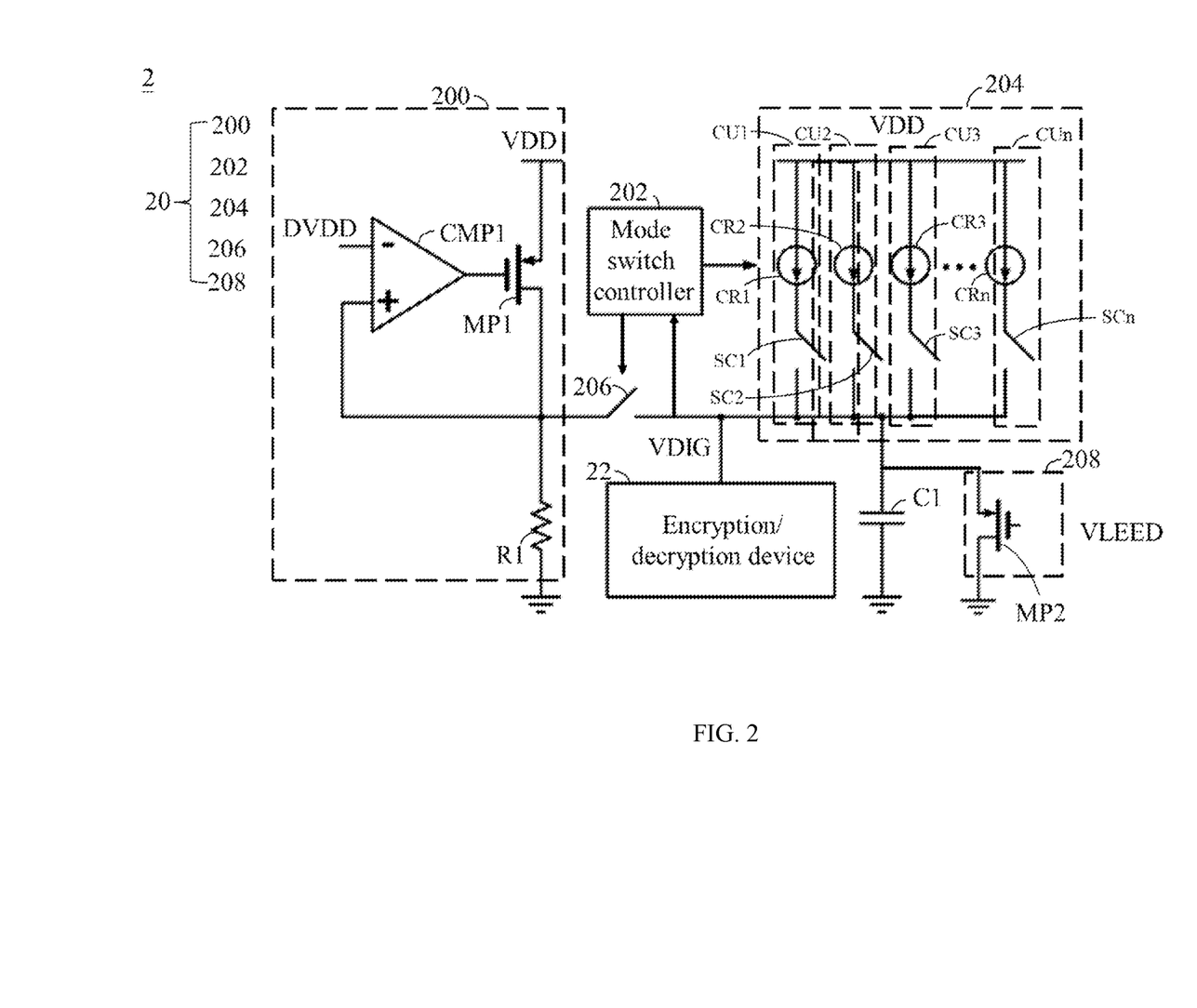
FIG. 2 is a circuit diagram of a secure system according to an embodiment of the present disclosure.

Firstly, refer to FIG. 2, and FIG. 2 is a circuit diagram of a secure system according to an embodiment of the present disclosure. A secure system 2 includes a power supply device 20 and an encryption/decryption device 22, wherein the power supply device 20 includes a stable voltage source 200, a mode switch controller 202, a secure power supply device 204 and a switch 206, wherein the voltage selection device is composed by the mode switch controller 202 and the switch 206. The power supply device 20 is configured to provide power to the encryption/decryption device 22 of the secure system 2, in order to avoid hackers to gain the security information by obtaining the change of a power characteristic through detecting a power pin and a ground pin (i.e., the change of the power characteristic of the system voltage). In other words, in the process of the encryption/decryption device 22 executes the encryption/decryption, there is not a large change to the power characteristic of the system voltage.

The secure power supply device 204 is configured to generate a supply voltage based on the system voltage and provide the supply voltage, wherein the supply voltage is applied to the encryption/decryption device 22, to be a driving voltage VDIG for driving the encryption/decryption device 22 (associated with the conductivity or open of the switch 206), and the supply voltage is dynamically adjusted based on the operation of the encryption/decryption device 22. By means of the secure power supply device 204, when the encryption/decryption device 22 executes the encryption/decryption, the change of the power characteristic of the system voltage is less than a specific range. For example, the change of the circuit or the voltage is less than 5%, but the present disclosure is not limited thereto. However, when only the secure power supply device 204 provides the supply voltage to be the driving voltage VDIG for the encryption/decryption device 22, the secure power supply device 204 may not provide sufficient total output current to the encryption/decryption device 22 as the consumed current required for the encryption/decryption, i.e., when the current switching unit for providing the current turned on in the secure power supply device 204 is insufficient, the secure power supply device 204 may not provide sufficient total output current to the encryption/decryption device 22. Therefore, the stable voltage source 200, the mode switch controller 202, and the switch 206 are configured in the power supply device 20 to solve the technical issue described above.

Figure 3:
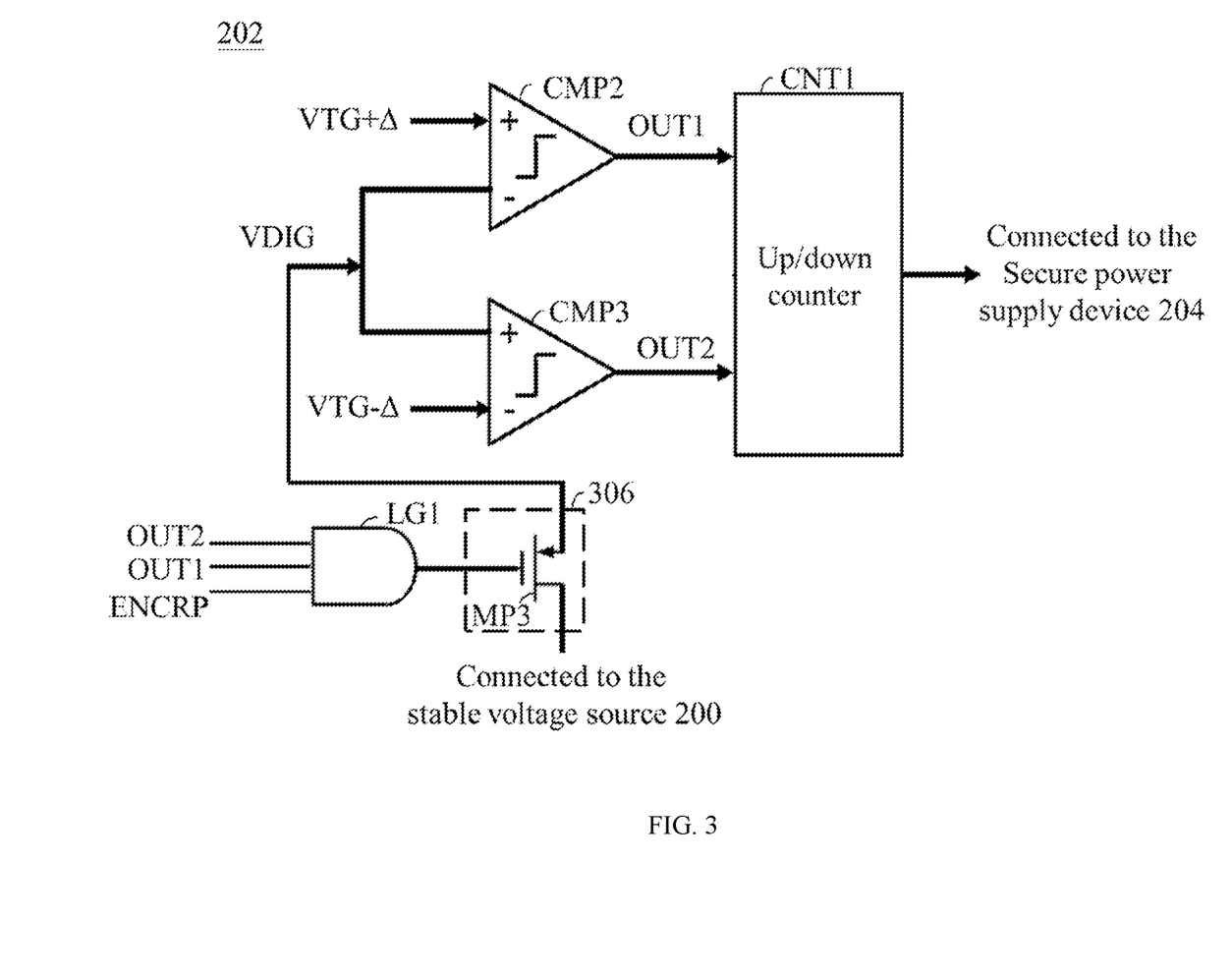
FIG. 3 is a circuit diagram of a mode switch controller according to an embodiment of the present disclosure.

The stable voltage source 200 is configured to provide a stable voltage that is not susceptible to change, wherein the stable voltage source 200 may be realized by a DC-DC convertor such as a bandgap voltage generator or a low-dropout regulator, etc. For example (but the present disclosure is not limited thereto), the stable voltage source 200 may be realized by a comparator CMP1, a resistor R1, and a PMOS transistor MP1. The mode switch controller 202 is electrically connected to the encryption/decryption device 22, configured to generate a first switch signal, and generate a second switch signal based on the first switch signal and the driving voltage VDIG of the encryption/decryption device 22, wherein the first switch signal is determined by an encryption/decryption working signal ENCRP (shown in FIG. 3 and FIG. 4) for indicating whether the encryption/decryption device 22 is in operation, and two output signals OUT1 and OUT2 (shown in FIG. 3) for indicating whether the driving voltage VDIG is fallen outside the voltage range between an upper limit voltage and a lower limit voltage. One implementation of the mode switch controller 202 is shown in FIG. 3, the details will be introduced later, and the present disclosure is not limited thereto. The switch 206 includes a first terminal, a second terminal and a control terminal, wherein the first terminal is electrically connected to the stable voltage source 200, the second terminal is electrically connected to the encryption/decryption device 22, and the control terminal is electrically connected the mode switch controller 202 in order to receive the first switch signal. The conductivity or open of the switch 206 (i.e., the conductivity or open of the first terminal and the second terminal) is controlled by the first switch signal.

The total output current generated by the secure power supply device 204 is controlled by a second switch signal. When the encryption/decryption device 22 executes the encryption/decryption, the supply voltage is as the driving voltage VDIG at first. Once the current consumption is increased and the driving voltage VDIG is less than the lower limit voltage, the switch 206 is switched by the first switch signal, so that both the supply voltage and the stable voltage are as the driving voltage VDIG, meanwhile, the second switch signal is updated and configured to control the secure power supply device 204 to increase the total output current, so as to increase the supply voltage and the driving voltage VDIG. Next, the driving voltage is back to the voltage range between the upper limit voltage and the lower limit voltage, the switch 206 is switched by the first switch signal, and the supply voltage is as the driving voltage VDIG. Compared to the previous supply voltage, the supply voltage in this time is already increased, so that it is possible to use only the supply voltage as the driving voltage VDIG again.

On the other hand, when the encryption/decryption device 22 executes the encryption/decryption, the supply voltage is as the driving voltage VDIG at first. Once the driving voltage VDIG is greater than the upper limit voltage, the switch 206 is switched by the first switch signal, so that both the supply voltage and the stable voltage are used as the driving voltage VDIG, meanwhile, the second switch signal is updated and configured to control the secure power supply device 204 to decrease the total output current of the secure power supply device 204, so as to decrease the supply voltage and the driving voltage VDIG. Next, the driving voltage is back to the voltage range between the upper limit voltage and the lower limit voltage, the switch 206 is switched by the first switch signal, and the supply voltage is used as the driving voltage VDIG. Compared to the previous supply voltage, the supply voltage in this time is already decreased, so that it is possible to use only the supply voltage as the driving voltage VDIG again.

Then, when the encryption/decryption device 22 does not execute the encryption/decryption or in the startup period, only the stable voltage provided by the stable voltage source 200 is used as the driving voltage of the encryption/decryption device 22. Thus, the secure power supply device 204 controlled by the first switch signal generated by the mode switch controller 202 does not provide the supply voltage and generate the total output current to the encryption/decryption device 22.

Figure 4:
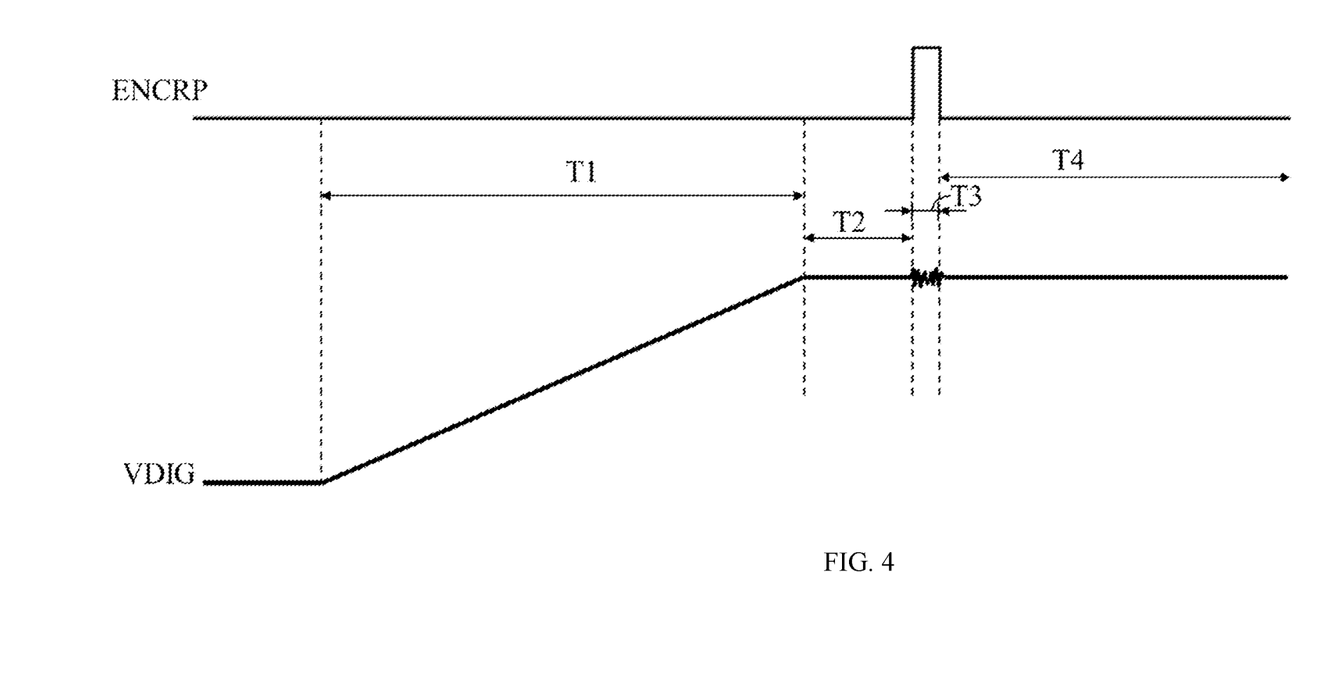
FIG. 4 is a waveform of partial signals of a secure system according to an embodiment of the present disclosure.

Refer to FIG. 2 and FIG. 4 at the same time, and FIG. 4 is a waveform of partial signals of a secure system according to an embodiment of the present disclosure. During a startup period (the interval T1), the switch 206 is conductive by the first switch signal generated by the mode switch controller 202 (i.e., the first terminal and the second terminal is conductive), the secure power supply device 204 does not provide the supply voltage, and the encryption/decryption device 22 receives only the stable voltage as the driving voltage VDIG. After the driving voltage reaches or approaches the target voltage of the driving voltage VDIG, the startup period (the interval T1) is finished, the switch 206 is conductive by the first switch signal generated by the mode switch controller 202 (i.e., the first terminal and the second terminal are conductive), the secure power supply device 204 does not provide the supply voltage, and the encryption/decryption device 22 receives only the stable voltage as the driving voltage VDIG.

After the startup period (the interval T1) is finished, the mode switch controller 202 determines whether selecting the supply voltage as the driving voltage VDIG based on the encryption/decryption working signal ENCRP. In the interval T2 after the interval T1, the encryption/decryption device 22 does not execute the encryption/decryption, the switch 206 is conductive by the first switch signal, and the secure power supply device 204 does not provide the supply voltage, so that the encryption/decryption device 22 receives only the stable voltage as the driving voltage VDIG.

In the interval T3, the encryption/decryption device 22 executes the encryption/decryption (the encryption/decryption working signal is at the logic high level). If the driving voltage VDIG is fallen within the voltage range between the upper limit voltage and the lower limit voltage, the switch 206 is opened by the first switch signal, the secure power supply device 204 is controlled by the second switch signal to output the total output current and provide the supply voltage to the encryption/decryption device 22 as the driving voltage VDIG. In the interval T3, if the driving voltage VDIG is fallen outside the voltage range between the upper limit voltage and the lower limit voltage, the switch 206 is conductive by the first switch signal, both the stable voltage and the supply voltage are used as the driving voltage VDIG. Furthermore, when selecting both the stable voltage and the supply voltage as the driving voltage VDIG, if the driving voltage VDIG is greater than the upper limit voltage, the supply voltage is decreased by the second switch signal until the driving voltage VDIG is less than the upper limit voltage, only the supply voltage is used as the driving voltage VDIG, and the supply voltage is stopped decreasing. Similarly, when both the stable voltage and the supply voltage are used as the driving voltage VDIG. If the driving voltage VDIG is less than the lower limit voltage, the supply voltage is increased by the second switch signal until the driving voltage VDIG is greater than the lower limit voltage, only the supply voltage is used as the driving voltage VDIG, and the supply voltage is stopped increasing. In the interval T4 after the interval T3, the encryption/decryption device 22 does not execute the encryption/decryption, the switch 206 is conductive by the first switch signal, and the secure power supply device 204 does not provide the supply voltage, so that the encryption/decryption device 22 receives only the stable voltage as the driving voltage VDIG.

Incidentally, although in the embodiment of the present disclosure, during both the startup period and the non-encryption/decryption period, the stable voltage is used as the driving voltage VDIG, but the present disclosure is not limited thereto. In other situations, it is also possible to use the supply voltage as the driving voltage VDIG in other situations.

Go back and refer to FIG. 2 again, the stable voltage source 200 may include a PMOS transistor MP1, a comparator CMP1, and a resistor R1. The source of the PMOS transistor is electrically connected to the system voltage VDD. The output terminal of the comparator CMP1 is electrically connected to the gate of the PMOS transistor, the negative input terminal of the comparator CMP1 receives the voltage less than the target voltage (e.g., another system voltage DVDD less than the system voltage VDD), the positive input terminal of the comparator CMP1 is electrically connected to the first terminal of the switch 206 and the drain of the PMOS transistor MP1. The resistor R1 includes two terminals, one terminal is electrically connected to the drain of the PMOS transistor MP1, and the other terminal is electrically connected to the low voltage (e.g. the ground voltage). The structure described above is formed to a negative feedback circuit, so that when the comparator CMP1 is in the stable state, the voltages on the positive input terminal and the negative input terminal of the comparator CMP1 is identical.

One implementation of the secure power supply device 204 is described below, but the present disclosure is not limited thereto. The secure power supply device 204 includes a plurality of current switching units CU1~CUn, wherein a plurality of terminals of the plurality of current switching units CU1~CUn are electrically connected to a system voltage VDD, the plurality of other terminals of the plurality of current switching units CU1~CUn are electrically connected to each other and configured to output the supply voltage as the driving voltage VDIG, and the plurality of current switching units CU1~CUn are controlled by a plurality of third switch signals, wherein the second switch signal includes the plurality of third switch signals.

The current switching unit CU1 includes a current source CR1 and a switch SC1, wherein one terminal of the current source CR1 is electrically connected to the system voltage VDD, two terminals of the switch SC1 are respectively electrically connected to the other terminal of the current source CR1 and the system voltage VDD, and the switch SC1 is controlled by the second switch signal. Similarly, the current switching unit CU2 includes a current source CR2 and a switch SC2, the current switching unit CU3 includes a current source CR3 and a switch SC3, the current switching unit CUn includes a current source CRn and a switch SCn, and the ways of the electrical connections between every one of the current sources CR2, CR3, and CRn and the every corresponding one of the switches SC2, SC3, and SCn are similar to the way of the electrical connection between current source CR1 and the switch SC1, so they are not described repeatedly.

When the encryption/decryption device 22 executes the encryption/decryption, the consumption of the current of the encryption/decryption device 22 is increased, and the driving voltage VDIG is decreased. When the driving voltage VDIG is less than the lower limit voltage VTG−Δ, the second switch signal generated by the mode switch controller 202 (including the plurality of third switch signals) increases the number of the plurality of conductive current switching units CU1~CUn, so as to increase the total output current of the plurality of current switching units CU1~CUn to improve the voltage of the driving voltage VDIG, wherein Δ is the voltage difference. The total output current of the plurality of current switching units CU1~CUn may be excessive and caused the driving voltage VDIG be increased. When the driving voltage VDIG is greater than the upper limit voltage VTG−Δ, the second switch signal generated by the mode switch controller 202 (including the plurality of third switch signals) increases the number of the plurality of opened current switching units CU1~CUn, so as to decrease the total output current of the plurality of current switching units CU1~CUn to reduce the voltage of the driving voltage VDIG.

Incidentally, the power supply device 20 further includes a ripple suppressing unit 208 that is in parallel with the capacitor C1 of the encryption/decryption device 22 and/or in parallel with the encryption/decryption device 22. Through the ripple suppressing unit 208 that is in parallel with the capacitor C1 of the encryption/decryption device 22 and/or in parallel with the encryption/decryption device 22, it is much effective to maintain the stability of the driving voltage, wherein the ripple suppressing unit 208 may be a PMOS transistor MP2 that the gate receives a fixed bias voltage VLEED. Also, the source and the drain of the PMOS transistor MP2 are respectively received the driving voltage VDIG and the low voltage (e.g., the ground voltage), so as to suppress the ripple when the driving voltage VDIG changes.

Refer to FIG. 3, and FIG. 3 is a circuit diagram of a mode switch controller according to an embodiment of the present disclosure. One implementation of the mode switch controller 202 is shown in FIG. 3, but the present disclosure is not limited thereto. The mode switch controller 202 includes a comparator CMP2, a comparator CMP3, a counter CNT1 and a logic circuit. The comparator CMP2 includes a positive input terminal configured to receive the upper limit voltage VTG+Δ and a negative input terminal configured to receive the driving voltage VDIG. The comparator CMP3 includes a positive input terminal configured to receive the driving voltage VDIG and a negative input terminal configured to receive the lower limit voltage VTG−Δ. The counter CNT1 includes two input terminals, wherein one input terminal is electrically connected to an output terminal of the comparator CMP2, and the other input terminal of the counter is electrically connected to the output terminal of the comparator CMP3. The first switch signal determines whether they are enabled or not, and the first switch signal is used to count up or down the output signals of the comparator CMP2 and the output signal of the comparator CMP3, so as to generate the second switch signal.

Furthermore, when the switch 206 is conductive by the first switch signal, the counter CNT1 is disabled, so that the supply voltage is not provided by the secure power supply device 204. Moreover, when the switch 206 is opened by the first switch signal, the counter CNT1 is enabled, so that the total output current is increased or decreased by the secure power supply device 204 based on the second switch signal outputted by the counter CNT1, so as to adjust the driving voltage VDIG.

The logic circuit LG1 is configured to receive the output signals OUT1 and OUT2 of the comparators CMP1 and CMP2, and receive the encryption/decryption working signal ENCRP, so as to generate the first switch signal, and the first switch signal is transferred to the switch 206 and the counter CNT1. Refer to FIG. 3 and FIG. 4 simultaneously, since only when the output signals OUT1, OUT2 are at the logic high level (the driving voltage is fallen within the voltage range) and the encryption/decryption working signal ENCRP is at the logic high level (the encryption/decryption is in operation), the switch 206 is not conductive. Thus, the logic circuit LG1 may be a gate, and the present disclosure is not limited thereto.

Figure 5:
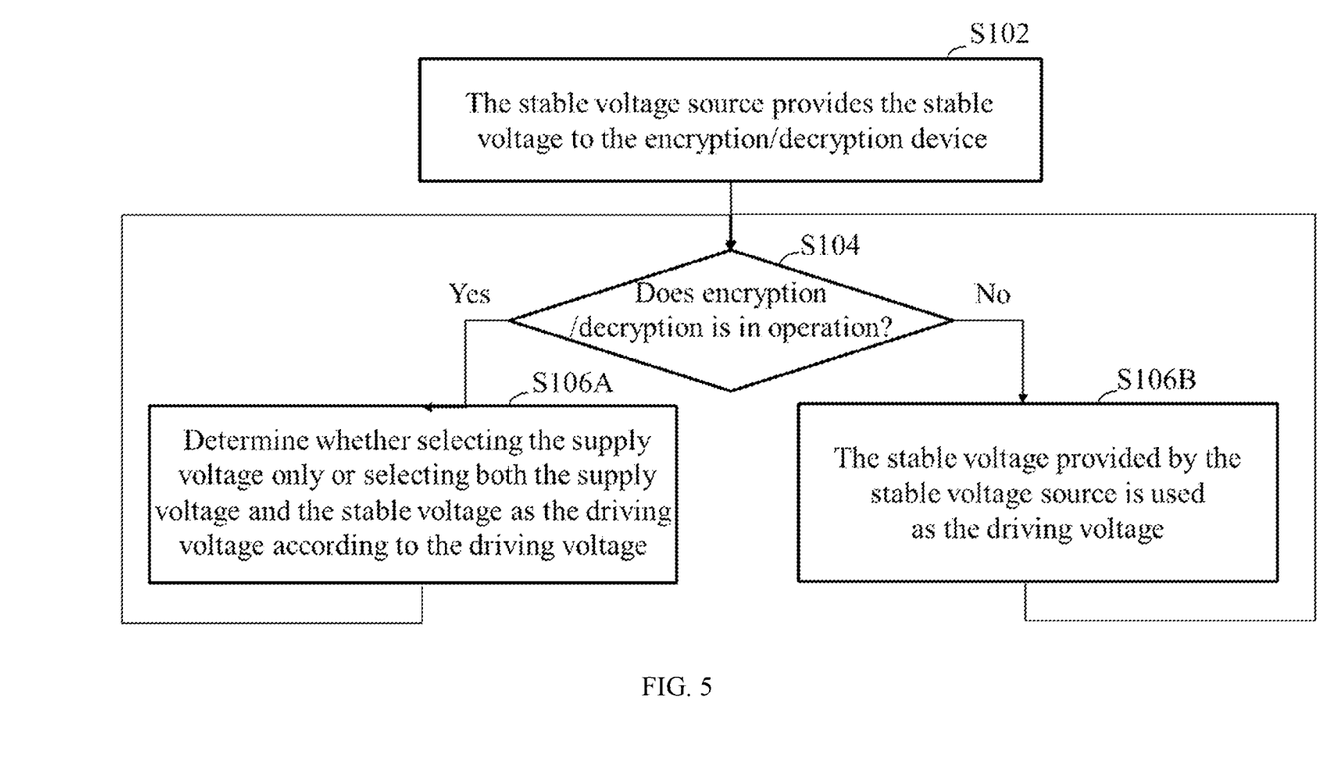
FIG. 5 is a flowchart of a power supplying method according to an embodiment of the present disclosure.

Refer to FIG. 5, and FIG. 5 is a flowchart of a power supplying method according to an embodiment of the present disclosure. The power supplying method is configured to the encryption/decryption device; the method may be executed by the power supply device, and including the following steps. At first, in step S102, during the startup period, the stable voltage provided by the stable voltage source is used as the driving voltage of the encryption/decryption device. Next, after the driving voltage approaches the target voltage, the startup period is finished. After the startup period is finished, the stable voltage provided by the stable voltage source is continuously used as the driving voltage of the encryption/decryption device. Later, in step S104, determining whether the encryption/decryption device is in operation. If the encryption/decryption device is not in operation, step S106B is executed, otherwise, step S106A is executed. In step S106A, the driving voltage is fallen within the voltage range between an upper limit voltage and a lower limit voltage, the supply voltage provided by the secure power supply device is used as the driving voltage for the encryption/decryption device. If the driving voltage is fallen outside the voltage range between an upper limit voltage and a lower limit voltage, both the supply voltage and the stable voltage are used as the driving voltage for the encryption/decryption device, the supply voltage is adjusted until the driving voltage falls within the voltage range, and only the supply is continuously used as the driving voltage. In step S106B, the stable voltage provided by the stable voltage source is used as the driving voltage.

In another embodiment of the present disclosure, the power supply device includes a secure power supply device, a stable voltage source, and a voltage selection device, wherein the voltage selection device is electrically connected to the secure power supply device, and the stable voltage source and the encryption/decryption device. When the encryption/decryption device executes the encryption/decryption, the voltage selection device monitors the driving voltage of the encryption/decryption device. When the driving voltage of the encryption/decryption device is fallen within a voltage range between an upper limit voltage and a lower limit voltage, the voltage selection device selects only the supply voltage as the driving voltage for the encryption/decryption device; and when the driving voltage is greater than the upper limit voltage or less than the lower limit voltage (i.e., fallen outside the voltage range between an upper limit voltage and a lower limit voltage), the voltage selection device selects only the stable voltage as the driving voltage for the encryption/decryption device, and increases or decreases the supply voltage at the same time. It is necessary for the manner in this embodiment to additionally set up a switch to control the supply of the supply voltage provided by the secure power supply device, and may not adjust the supply voltage immediately and quickly to be fallen within the voltage range. On the other hand, it is easier for the manner in the previous embodiment to adjust the supply voltage immediately and quickly to be fallen within the voltage range (since the driving voltage is provided by both the supply voltage and the stable voltage). Adjusting the supply voltage immediately and quickly to be fallen within the voltage range is indicated it is less possible that the driving voltage is fallen outside the voltage range when switching to select the supply voltage as the driving voltage.

In summary, a plurality of the power supply devices, methods, and the secure systems provided in the embodiments of the present disclosure may realize the technical effects that avoiding hackers to obtain the security information by detecting the power pin and the ground pin Additionally, compared to the prior art, the plurality of the power supply devices, methods and the secure systems provided in the embodiments of the present disclosure may further reduce the size that the charge storage capacitor needs, the operating time, the current consumption, and the circuit area. Moreover, it is noted that the system complexity of the plurality of the power supply devices, methods, and the secure systems provided in the embodiments of the present disclosure is not high, so it is easy to implement and without huge manufacturing costs. Thus, there are high practicality and market value for the plurality of the power supply devices, methods, and the secure systems provided in the embodiments of the present disclosure.

All examples and embodiments in the present disclosure are only used to state the purpose. The modifications or changes based on the present disclosure will be suggested to those skilled in the art, and are be included in the essence, the scope, and the scope of the appended claims in the present disclosure.

What is claimed is:

1. A power supply device, configured to supply a power to an encryption/decryption device of a secure system, comprising:
   a secure power supply device, configured to provide a supply voltage, wherein the supply voltage is dynamically adjusted based on an operation of the encryption/decryption device;
   a stable voltage source, configured to provide a stable voltage; and
   a voltage selection device, electrically connected to the secure power supply device, the stable voltage source and the encryption/decryption device; wherein
   when the encryption/decryption device is in operation and a driving voltage of the encryption/decryption device is fallen within a voltage range between an upper limit voltage and a lower limit voltage, the voltage selection device selects only the supply voltage as the driving voltage for the encryption/decryption device, and
   when the encryption/decryption device is in operation and the driving voltage is fallen outside the voltage range, the voltage selection device selects both of the supply voltage and the stable voltage as the driving voltage for the encryption/decryption device, and the supply voltage is adjusted until the driving voltage falls within the voltage range.

2. The power supply device of claim 1, wherein
   when the encryption/decryption device is in operation and the driving voltage is greater than the upper limit voltage, the supply voltage is decreased by the voltage selection device until the driving voltage is less than the upper limit voltage, and then only the supply voltage is selected as the driving voltage for the encryption/decryption device; and
   when the encryption/decryption device is in operation, and the driving voltage is less than the lower limit voltage, the supply voltage is increased by the voltage selection device until the driving voltage is greater than the lower limit voltage, and then only the supply voltage is selected as the driving voltage for the encryption/decryption device.

3. The power supply device of claim 1, wherein the voltage selection device comprises:
   a mode switch controller, electrically connected to the encryption/decryption device and the secure power supply device, configured to generate a first switch signal, and generate a second switch signal based on the first switch signal and the driving voltage of the encryption/decryption device, wherein the first switch signal is configured to indicate whether the encryption/decryption device is in operation and whether the driving voltage is fallen within the voltage range; and
   a switch, comprising a first terminal, a second terminal and a control terminal, wherein the first terminal is electrically connected to the stable voltage source, the second terminal is electrically connected to the encryption/decryption device, and the control terminal is electrically connected the mode switch controller in order to receive the first switch signal;
   wherein the supply voltage provided by the secure power supply device is controlled by the second switch signal.

4. The power supply device of claim 3, wherein
   during a startup period, the mode switch controller makes the first terminal and the second terminal be conductive and generates the second switch signal, so that the supply voltage is not provided by the secure power supply device, the stable voltage is received by the encryption/decryption device as the driving voltage, and the startup period is finished after the driving voltage is closed to a specific voltage; and after the startup period is finished:

when the encryption/decryption device is in operation, and the driving voltage is fallen within the voltage range, the mode switch controller makes the first terminal and the second terminal be opened, and only the supply voltage is received by the encryption/decryption device as the driving voltage;

when the encryption/decryption device is in operation, and the driving voltage is fallen outside the voltage range, the mode switch controller makes the first terminal and the second terminal be conductive, both of the supply voltage and the stable voltage are received by the encryption/decryption device as the driving voltage, and the mode switch controller generates the second switch signal to make the secure power supply device adjust the supply voltage, so as to make the driving voltage fallen within the voltage range; and when the encryption/decryption device is in operation, the mode switch controller makes the first terminal and the second terminal conductive and generates the second switch signal, so that the supply voltage is not provided by the secure power supply device, and only the stable voltage is received by the encryption/decryption device as the driving voltage.

5. The power supply device of claim 4, wherein the secure power supply device comprises:

a plurality of current switching units, wherein a plurality of terminals of the plurality of current switching units are electrically connected to a system voltage, the plurality of other terminals of the plurality of current switching units are electrically connected to each other and used to output the supply voltage, the plurality of current switching units are controlled by a plurality of third switch signals, respectively, and the second switch signal comprises the plurality of third switch signals.

6. The power supply device of claim 5, wherein the stable voltage source comprises:

a PMOS transistor, wherein a source of the PMOS transistor is electrically connected to the system voltage;

a comparator, wherein an output terminal of the comparator is electrically connected to a gate of the PMOS transistor, the target voltage is received by a negative input terminal of the comparator, and a positive input terminal is electrically connected to a drain of the PMOS transistor; and a resistor, comprising two terminals, wherein one terminal of the resistor is electrically connected to the drain of the PMOS transistor, and the other terminal of the resistor is electrically connected to a low voltage.

7. The power supply device of claim 1, wherein the mode switch controller comprises:

a first comparator, wherein the upper limit voltage is received by a positive input terminal of the first comparator, the driving voltage is received by a negative input terminal of the first comparator, and the upper limit voltage is a total value of a voltage difference plus a target voltage of the driving voltage;

a second comparator, wherein the driving voltage is received by a positive input terminal of the second comparator, the lower limit voltage is received by a negative input terminal of the second comparator, and the lower limit voltage is a total value of a voltage difference minus the target voltage of the driving voltage;

a counter, wherein one input terminal of the counter is electrically connected to an output terminal of the first comparator, and the other input terminal of the counter is electrically connected to an output terminal of the second comparator, and the counter counts up or counts down based on an output signal of the first comparator and an output signal of the second comparator to generate the first switch signal; and a logic circuit, configured to receive the output signal of the first comparator, the output signal of the second comparator and an encryption/decryption working signal to generate the first switch signal.

8. A secure system, comprising:

an encryption/decryption device; and a power supply, configured to supply a power to the encryption/decryption device of a secure system, comprising:

a secure power supply device, configured to provide a supply voltage, wherein the supply voltage is dynamically adjusted based on an operation of the encryption/decryption device;

a stable voltage source, configured to provide a stable voltage; and a voltage selection device, electrically connected to the secure power supply device, the stable voltage source and the encryption/decryption device;

wherein when the encryption/decryption device is in operation, and a driving voltage of the encryption/decryption device is fallen within a voltage range between an upper limit voltage and a lower limit voltage, the voltage selection device selects only the supply voltage as the driving voltage for the encryption/decryption device; and when the encryption/decryption device is in operation, and the driving voltage is fallen outside the voltage range, the voltage selection device selects both of the supply voltage and the stable voltage as the driving voltage for the encryption/decryption device, and the supply voltage is adjusted until the driving voltage falls within the voltage range.

9. The secure system of claim 8, wherein when the encryption/decryption device is in operation, and the driving voltage is greater than the upper limit voltage, the supply voltage is decreased by the voltage selection device until the driving voltage is less than the upper limit voltage, and then only the supply voltage is selected as the driving voltage for the encryption/decryption device; and when the encryption/decryption device is in operation, and the driving voltage is less than the lower limit voltage, the supply voltage is increased by the voltage selection device until the driving voltage is greater than the lower limit voltage, and then only the supply voltage is selected as the driving voltage for the encryption/decryption device.

10. The secure system of claim 8, wherein the voltage selection device comprises:

a mode switch controller, electrically connected to the encryption/decryption device and the secure power supply device, configured to generate a first switch signal, and generate a second switch signal based on the first switch signal and the driving voltage of the encryption/decryption device, wherein the first switch signal is configured to indicate whether the encryption/decryption device is in operation and whether the driving voltage is fallen within the voltage range; and a switch, comprising a first terminal, a second terminal and a control terminal, wherein the first terminal is electrically connected to the stable voltage source, the second terminal is electrically connected to the encryption/decryption device, and the control terminal is electrically connected the mode switch controller in order to receive the first switch signal;

wherein the supply voltage provided by the secure power supply device is controlled by the second switch signal.

11. The secure system of claim 10, wherein during a startup period: the mode switch controller makes the first terminal and the second terminal be conductive, and the second switch signal is generated, so that the supply voltage is not provided by the secure power supply device, the stable voltage is received by the encryption/decryption device as the driving voltage, and the startup period is finished after the driving voltage is closed to a specific voltage; and after the startup period is finished:

when the encryption/decryption device is in operation, and the driving voltage is fallen within the voltage range, the mode switch controller makes the first terminal and the second terminal be opened, and only the supply voltage is received by the encryption/decryption device as the driving voltage;

when the encryption/decryption device is in operation, and the driving voltage is fallen outside the voltage range, the mode switch controller makes the first terminal and the second terminal be conductive, both of the supply voltage and the stable voltage are received by the encryption/decryption device as the driving voltage, and the second switch signal is generated by the mode switch controller to make the secure power supply device adjust the supply voltage, so as to make the driving voltage fallen within the voltage range; and when the encryption/decryption device is in operation, the mode switch controller makes the first terminal and the second terminal conductive, the second switch signal is generated, so that the supply voltage is not provided by the secure power supply device, and only the stable voltage is received by the encryption/decryption device as the driving voltage.

12. The secure system of claim 11, wherein the secure power supply device comprises:

a plurality of current switching units, wherein a plurality of terminals of the plurality of current switching units are electrically connected to a system voltage, the plurality of other terminals of the plurality of current switching units are electrically connected to each other and used to output the supply voltage, the plurality of current switching units are controlled by a plurality of third switch signals, and the second switch signal comprises the plurality of third switch signals.

13. The secure system of claim 12, wherein the stable voltage source comprises:

a PMOS transistor, wherein a source of the PMOS transistor is electrically connected to the system voltage;

a comparator, wherein an output terminal of the comparator is electrically connected to a gate of the PMOS transistor, a voltage of a target voltage is received by a negative input terminal of the comparator, and a positive input terminal is electrically connected to a drain of the PMOS transistor; and a resistor, comprising two terminals, wherein one terminal of the resistor is electrically connected to the drain of the PMOS transistor, and the other terminal of the resistor is electrically connected to a low voltage of the PMOS transistor.

14. The secure system of claim 1, wherein the mode switch controller comprises:

a first comparator, wherein the upper limit voltage is received by a positive input terminal of the first comparator, the driving voltage is received by a negative input of the first comparator, and the upper limit voltage is a total value of a voltage difference plus a target voltage of the driving voltage;

a second comparator, wherein the driving voltage is received by a positive input terminal of the second comparator, the lower limit voltage is received by the negative input terminal of the second comparator, and the lower limit voltage is a total value of a voltage difference minus the target voltage of the driving voltage;

a counter, wherein one input terminal of the counter is electrically connected to an output terminal of the first comparator, and other input terminal of the counter is electrically connected to an output terminal of the second comparator, and the counter counts up or counts down based on an output signal of the first comparator and an output signal of the second comparator to generate the first switch signal; and a logic circuit, configured to receive the output signal of the first comparator, the output signal of the second comparator and an encryption/decryption working signal to generate the first switch signal; wherein when the encryption/decryption device is in operation, and the driving voltage of the encryption/decryption device is fallen within a voltage range between an upper limit voltage and a lower limit voltage, the voltage selection device selects only the supply voltage as the driving voltage for the encryption/decryption device.

15. A power supply device, configured to provide a power to an encryption/decryption device of a secure system, comprising:

a secure power supply device, configured to provide a supply voltage based on a system voltage, wherein the supply voltage is dynamically adjusted based on an operation of the encryption/decryption device;

a stable voltage source, configured to provide a stable voltage; and a voltage selection device, electrically connected to the secure power supply device, the stable voltage source and the encryption/decryption device; wherein when the encryption/decryption device is in operation, and a driving voltage of the encryption/decryption device is fallen within a voltage range between an upper limit voltage and a lower limit voltage, the voltage selection device selects only the supply voltage as the driving voltage for the encryption/decryption device; and when the encryption/decryption device is in operation, and the driving voltage is fallen outside the voltage range, the voltage selection device selects only the stable voltage as the driving voltage for the encryption/decryption device, the supply voltage is adjusted until the driving voltage falls within the voltage range, and then only the supply voltage is selected as the driving voltage for the encryption/decryption device.

* * * * *